(12) United States Patent
Hine et al.

(10) Patent No.: US 9,308,440 B2
(45) Date of Patent: Apr. 12, 2016

(54) INPUT DEVICE FOR GAME MACHINE

(75) Inventors: Ryo Hine, Osaka (JP); Masakatsu Watanabe, Hyogo (JP); Hiroshi Hayasaka, Hyogo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1711 days.

(21) Appl. No.: 12/746,318

(22) PCT Filed: Dec. 2, 2008

(86) PCT No.: PCT/JP2008/071877
§ 371 (c)(1),
(2), (4) Date: Sep. 2, 2010

(87) PCT Pub. No.: WO2009/072489
PCT Pub. Date: Jun. 11, 2009

(65) Prior Publication Data
US 2010/0323792 A1    Dec. 23, 2010

(30) Foreign Application Priority Data
Dec. 6, 2007  (JP) .................................. 2007-316334

(51) Int. Cl.
*A63F 13/06*    (2006.01)
*A63F 13/20*    (2014.01)

(52) U.S. Cl.
CPC ......... *A63F 13/06* (2013.01); *A63F 2300/1043* (2013.01); *A63F 2300/1075* (2013.01); *A63F 2300/303* (2013.01)

(58) Field of Classification Search
CPC ...................................................... A63F 13/06
USPC .................................. 463/12–38, 40, 42, 46
See application file for complete search history.

(56) References Cited

U.S. PATENT DOCUMENTS

| | | | |
|---|---|---|---|
| 6,379,244 B1 | 4/2002 | Sagawa et al. | |
| 6,461,239 B1 | 10/2002 | Sagawa et al. | |
| 6,514,145 B1 | 2/2003 | Kawabata et al. | |
| 6,535,202 B1 * | 3/2003 | Amari .................. | H01H 13/705 341/22 |

(Continued)

FOREIGN PATENT DOCUMENTS

| | | |
|---|---|---|
| CN | 1215619 A | 5/1999 |
| CN | 1317983 A | 10/2001 |

(Continued)

OTHER PUBLICATIONS

Chinese Office Action dated Jan. 22, 2014 for Application No. 2012-10129735.5.
Extended European Search Report dated Nov. 17, 2010, corresponding to European Patent Application No. EP 08 85 6012.

*Primary Examiner* — David L Lewis
*Assistant Examiner* — Shauna-Kay Hall
(74) *Attorney, Agent, or Firm* — Locke Lord LLP (57) ABSTRACT

A push button panel 16, which has a transparent panel main body 16a for allowing a screen image on a display surface 10a to be visually seen, is disposed for each void part 15b between opaque frames 15a of a lattice panel 15 disposed on the display surface 10a of a monitor 10. Extended parts 16c are disposed at the four corners of an outer circumference of the push button panel 16, such that they are extending outwardly in the diagonal directions, and these extended parts 16c are fitted to recessed parts 15c provided at the four corners of an void part 15b of the lattice panel 15 . A rubber contact 17, in which electrodes functioning as detecting means are embedded in an elastic body functioning as supporting means, is disposed at a lower surface side of each extended part 16c.

8 Claims, 11 Drawing Sheets

(56) References Cited

U.S. PATENT DOCUMENTS

| | | | |
|---|---|---|---|
| 7,841,936 B2 * | 11/2010 | Berman | G07F 17/3211 463/20 |
| 1,016,594 A1 | 7/2011 | Grundstedt et al. | |
| 2005/0253821 A1 * | 11/2005 | Roeder | G06F 1/1601 345/173 |
| 2007/0155511 A1 | 7/2007 | Grundstedt et al. | |
| 2009/0107817 A1 * | 4/2009 | Onuki | H01H 13/023 200/314 |

FOREIGN PATENT DOCUMENTS

| | | |
|---|---|---|
| EP | 0903169 A2 | 3/1999 |
| EP | 1120142 A1 | 8/2001 |
| EP | 1557211 A1 | 7/2005 |
| JP | 56-152670 A | 11/1981 |
| JP | 01-249083 A | 10/1989 |
| JP | 2000-084233 A | 3/2000 |
| JP | 2005-143714 A | 6/2005 |
| JP | 2005-204757 A | 8/2005 |

\* cited by examiner

INPUT DEVICE FOR GAME MACHINE

CROSS-REFERENCE TO RELATED APPLICATIONS

This application is the national stage application pursuant to 35 U.S.C. §371 of PCT application PCT/JP2008/071877, filed Dec. 2, 2008, which claims the benefit of Japanese Application No. 2007-316334, filed Dec. 6, 2007. The entire contents of the aforementioned applications are hereby incorporated herein by this reference.

TECHNICAL FIELD

The present invention relates to an input device for game machine.

BACKGROUND ART

There is a known game apparatus includes an input device having plural transparent boards disposed on a surface of a CRT display, each of four corners of each transparent board being supported by a spring, the input device being provided in an on/off switchable manner by conductive bodies and electrodes displaced from the springs, each screen image on the display is caused to change for each transparent board, and it is competed to see whether or not push-down operation has been performed to the transparent board of a predetermined screen image (for example, cf. a patent document 1). Also, there is a known input device for a game machine where a display device causing a hit target to appear and disappear is disposed on the back surface of a transparent hit board where a plurality of hit detection devices are arranged, such that the display device and the hit board are corresponded to each other on one-to-one (for example, cl. a patent document 2).
Patent Document 1:JP-A-sho-56-152670
Patent Document 2:JP-A-2000-84233

DISCLOSURE OF INVENTION

Problems to be Solved by the Invention

According to the conventional input device disclosed in the patent document 1, a supported position of a operation member is displaced from the electrode for detecting the push-down operation to the operation member. Therefore, it is difficult to obtain both of stability of supporting the operation member and sensibility of detecting the push-down operation. For example, when the operation member is pushed down obliquely downward, the sensibility of detection could be lessened because electricity is not conducted through the electrodes. Moreover, in the case of the input device disclosed in the patent document 1, as a wiring condition is complicated, an affection could be given to the push-down operation. That could cause the sensibility of detection to be lessens.

Then, the present invention aims to provide an input device for game machine, which can realize a good sensibility of detection while supporting the operation member stably.

MEANS FOR SOLVING THE PROBLEM

An input device of the present invention solves the above problem, by being configured as an input device for a game machine, comprising: a partitioned member which has opaque frames to be disposed on a display surface of a display apparatus, and in which a plurality of void parts for allowing a screen image on the display surface to be visually seen are disposed between frames; a plurality of operation members, each of which is disposed over each of the plurality of void parts of the partitioned member and has an operation part with enough transparency to allow the screen image on the display surface to be visually seen; a plurality of supporting means, each of which supports the operation member in a push-down operable manner; and a plurality of detecting means, each of which detects a push-down operation of the operation member, wherein the operation member is provided with a plurality of extended parts, each of which is extended outward, on an outer periphery thereof, the partitioned member is provided with a plurality of recessed parts, to each of which each of the plurality of extended parts of the operation member is fitted, such that the recessed part enlarges the void part, and a plastic elastic body with electrodes, in which electrodes functioning as the detecting means are embedded in an elastic body functioning as the supporting means, is disposed at a lower surface side of each of the plurality of extended parts of the operation member.

According to the input device of the present invention, as the extended parts are provided on the outer periphery of the operation member and each of the extended parts is supported from the lower surface side thereof with the plastic elastic body with electrodes, it is possible to improve the stability of support of the operation member. Moreover, as the push-down operation is detected by the electrodes disposed at the position supported by the plastic elastic body with electrodes, a supported point of the operation member and a detected point of the push-down operation are coincident with each other. Thereby, it is possible to improve the sensibility of detection.

As one of embodiments of the input device of the present invention, a lattice panel, in which the frames are arranged vertically and horizontally, may be disposed as the partitioned member, a push button panel, which has a quadrangular flat plate shaped panel main body as the operating part, may be disposed as the operation member, and the extended part may be disposed in an extended manner in diagonal directions of the push button panel from four corners thereof. According to this embodiment, each of the four corners of the pushbutton panel in the shape of a quadrangular flat plate is supported with the plastic elastic body with electrodes, the stability of support is high and it is possible to improve easily the sensibility of detection.

A wiring assembly may be disposed along the frames at a lower surface side of the partitioned member, the wiring assembly may be exposed outward from the frame at the recessed part, and the plastic elastic body with electrodes may be disposed at the exposed part. According to this embodiment, it is possible to electrically connect the wiring assembly to the plastic elastic body with electrodes by, while covering the wiring assembly with the frame, exposing the wiring assembly at the recessed part.

A cover extending along the frames may be disposed at an upper surface side of the partitioned member, and the extended parts may be covered by the cover. According to this embodiment, it is possible to improve an aesthetic sense of the input device by covering the frame existing between the operation members.

The operating part of the operation member may be provided with a flange on an outer periphery thereof, the extended part maybe disposed such that part of the flange is extended outward, and the flange, which includes the extended part, may be configured so as to lessen a transparency in comparison with the operation part. According to this embodiment, it is impossible or hard to recognize the extended part and the plastic elastic body with electrodes at the lower surface side of the extended part through the operation member. Thereby, it is possible to improve an aesthetic sense of the input device.

A transparent base board may be disposed between the partitioned member and the display surface, and the plastic elastic body with electrodes and the operation members may be disposed on the base board. According to this embodiment, by accepting the plastic elastic body with electrodes and the operation member on the base board, it is possible to protect the display surface of the display apparatus from the load at the moment of the push-down operation.

EFFECTS OF THE INVENTION

As mentioned above, in the input device of the present invention, a plurality of extended parts are provided in such a manner that the extended parts is extended outward from the outer periphery of the operation member. At a lower surface side of each of the extended parts, the plastic elastic body with electrodes is disposed. Thereby, the input device is configured in such a manner that while the operation member is supported at the outer periphery where the operation member can be supported most stably, the push-down operation can be detected at the same position as the supported point. Thereby, it is possible to realize a good sensibility of detection while the operation member being supported stably.

BEST MODE FOR CARRYING OUT THE INVENTION

Figure 1:
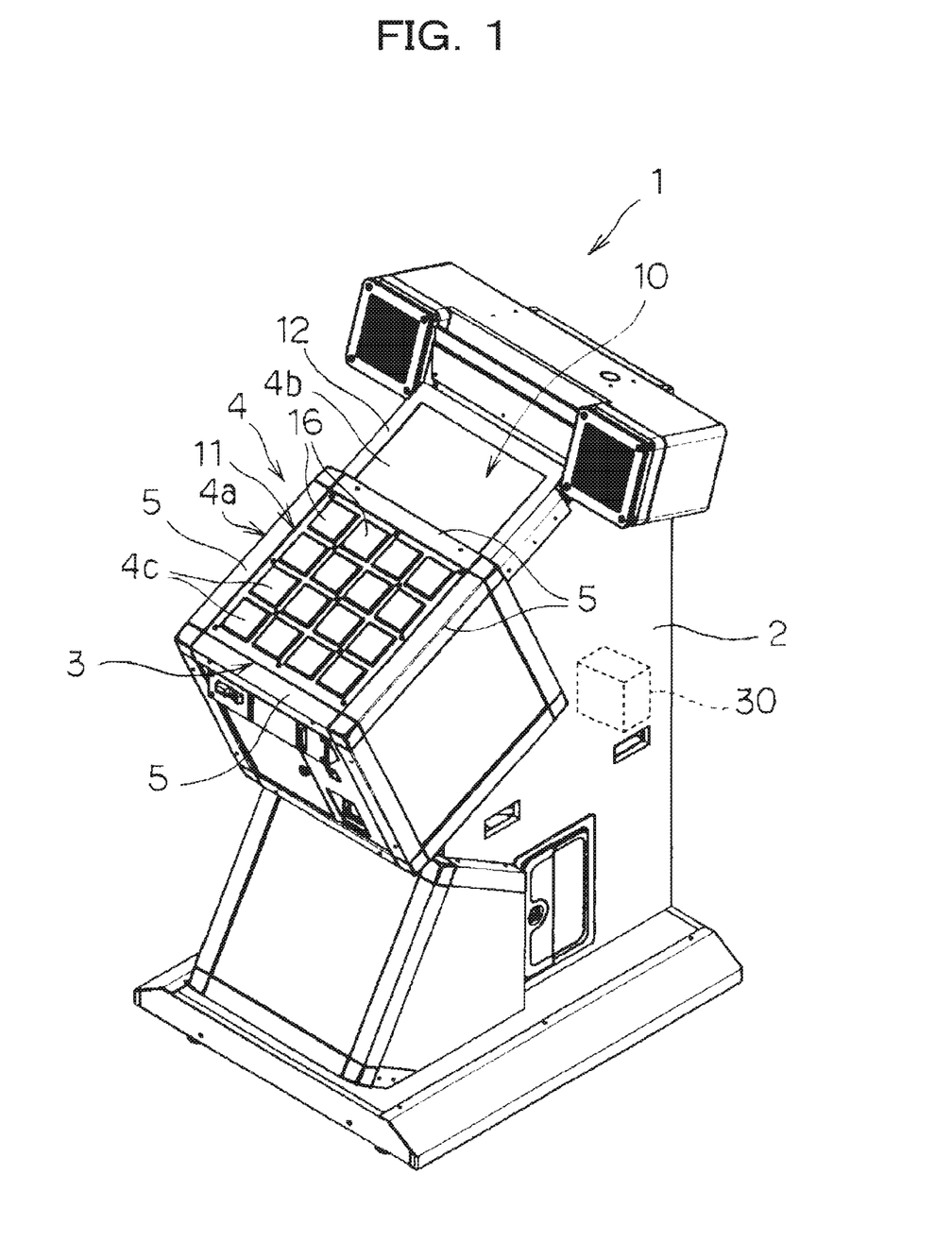
FIG. 1 shows a perspective view of a game machine to which one embodiment of an input device of the present invention is applied.

FIG. 1 shows a schematic view of a game machine to which one embodiment of an input device of the present invention is applied. The game machine 1, which is installed in a commercial facility and the like, is configured as a game machine providing a player with a playing chance in exchange of consumption of a predetermined amount of play value. In the game machine 1, a chassis 2 is provided. At the front side of the chassis 2, a control panel part 3 is provided. In the control panel part 3, an interface unit 4 is provided in an inclined condition like a rising slop from a front edge thereof to an end edge thereof. The interface unit 4 is one unit into which display function and input function are integrated. The height of the interface unit 4 is set in a range that an adult player of standard-tall can put naturally his/her fingers on the interface unit 4. Additionally, the inclination angle to a horizontal plane of the interface unit 4 is inclined to the horizontal plane, in such a manner that the player faces the interface unit 4 when looking down diagonally forward with a kind of bent-over posture. The interface unit 4 is partitioned by an input display part 4a as a first display part and a multi purpose display part 4b as a second display part. In the input display part 4a, sixteen pieces of push button parts 4c are provided in such a manner that they are arranged in the shape of a matrix having 4 rows and 4 columns.

Figure 2:
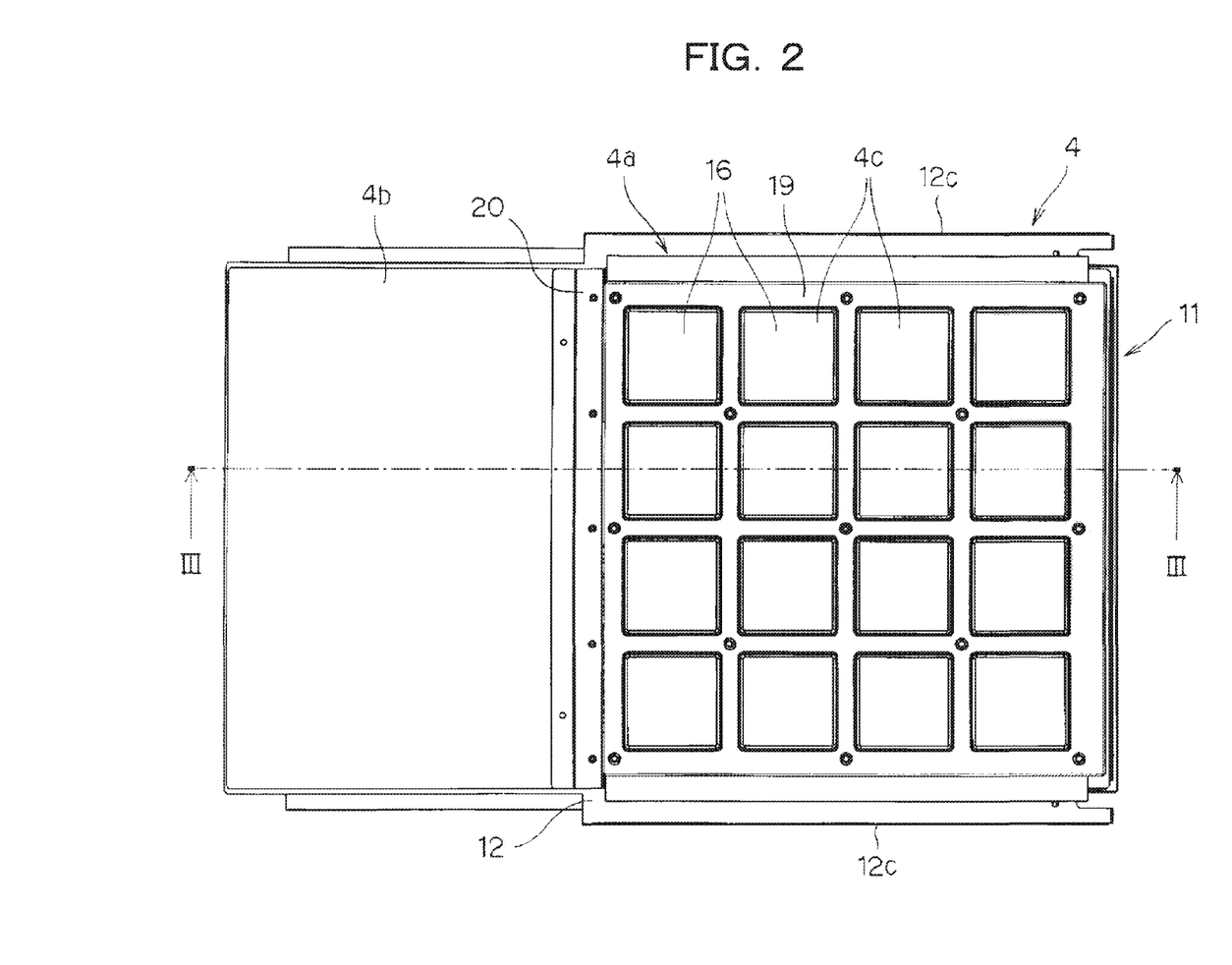
FIG. 2 shows a plane view of the interface unit.
Figure 3:
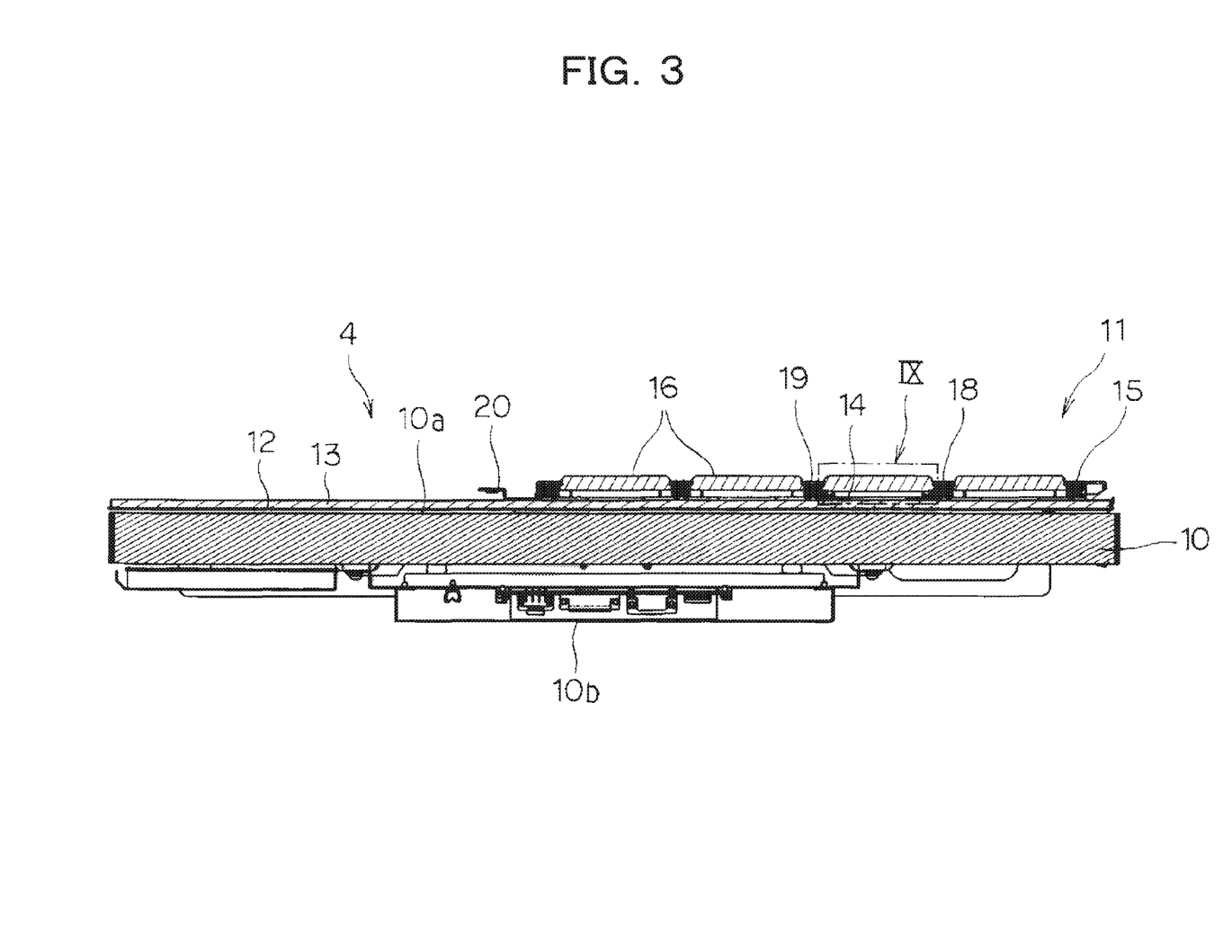
FIG. 3 shows a sectional view of the interface unit of a set-up condition along the line III-III shown in FIG. 2.

FIG. 2 shows a plane view of the interface unit 4, and FIG. 3 shows a sectional view of the interface unit 4 of a set-up condition, the sectional view being along the line III-III shown in FIG. 2. As shown in these drawings, the interface unit 4 has a monitor 10 as a display apparatus and an input module 11 as an input device. As an example of the monitor 10, a liquid crystal display is employed, which has a display surface 10a the aspect ratio of which is set to sixteen to nine or the neighborhood thereof and is put on the market as a PC monitor. Of course, not only the liquid crystal display, various kinds of display such as an EL display and an LED display can be employed as the monitor 10. On the back surface of the monitor 10 (the lower surface in FIG. 3), a terminal part 10b is provided to connect video cables or the like.

Figure 4:
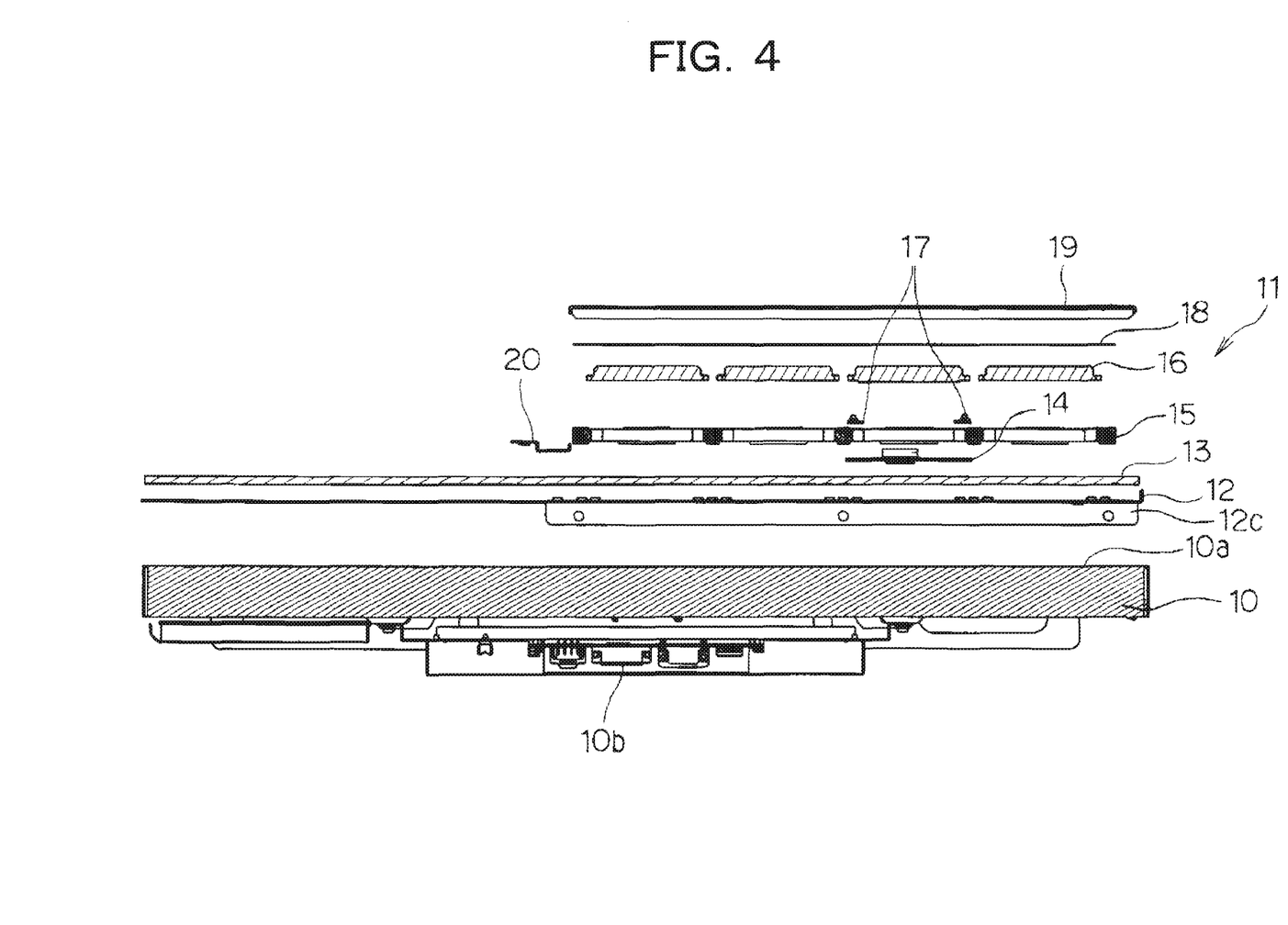
FIG. 4 shows a sectional view of the interface unit of a disassemble condition.
Figure 5:
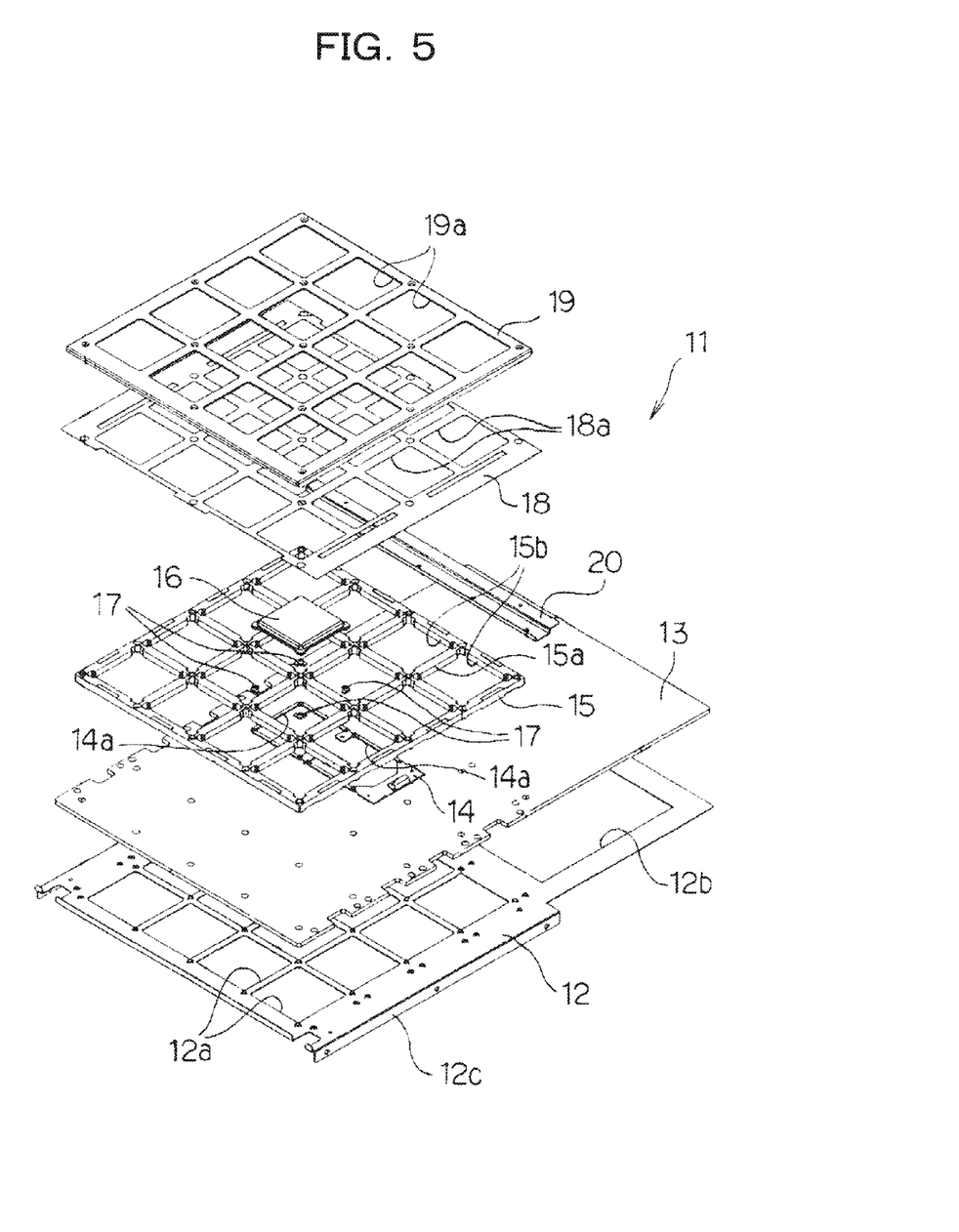
FIG. 5 shows an exploded perspective view of the input module.

FIG. 4 shows a sectional view of the interface unit 4 of a disassemble condition, and FIG. 5 shows an exploded perspective view of the input module 11. As shown in these drawings, the input module 11 is structured as an assembled part obtained by combining a base 12, a lattice base 13, panel substrates 14, a lattice panel 15, push button panels 16, rubber contacts 17 as plastic elastic bodies with electrodes, a button cover 18 and a lattice cover 19. The base 12 is a part functioning as a basal plate for joining the whole of the input module 11 and the chassis 2. The size of the base 12 (a vertical and horizontal size) is set in a range that can cover completely the display surface 10a of the monitor 10. The base 12 is configured as, for example, an opaque part obtained by applying sheet-metal processing to a metal plate. However, as long as the base 12 is composed of opaque material, it is not necessary that the base 12 is a metal product. In the base 12, for recognizing screen image in the monitor 10, 16 pieces of square-shaped button perforated parts 12a and a single display perforated part 12b are provided. The button perforated parts 12a are first perforated holes corresponding to the push button parts 4c on one-to-one, and are arranged in the shape of a matrix having 4 rows and 4 columns. The display perforated part 12b is a second perforated hole corresponding to the multi purpose display part 4b. The display perforated part 12b is in the shape of a rectangular, the width of which is slightly smaller than a entire width (the size in the right-left direction) of the display surface 10a of the monitor 10. At each of both sides of the base 12, a folding back part 12c is formed. The folding back parts 12c are provided to fix the input module 11 to the chassis 2.

The lattice base 13 is a flat-plate-shaped base board to ensure rigidity of the input module 11. The whole of the lattice base 13 is composed of transparent plastic. The size of the lattice base 13 is set to a degree that can cover the whole of the base 12 except the folding back parts 12c. The panel substrate 14 is a printed-wiring assembly for connecting electrically a control unit 30 (FIG. 1) of the game machine 1 to each rubber contact 17. Each of the panel substrates 14 is disposed on the lattice base 13 so as to be shared by two of the pushbutton parts 4c, one push button part 4c is disposed on the outer periphery of the input module 11 and the other push button part 4c abuts on the other one inward. Accordingly, the number of the panel substrates 14 is eight in total. By sharing sixteen pieces of the push button parts 4c by plural panel substrates 14 in this way, it is possible to make lessen trouble to be required because of a fix or an exchange in the case when a part of the panel substrate 14 does not work. Moreover, as each of four push button parts 4c disposed in a center part of the input display part 4a and the push button part 4c abutting on the outer periphery of the four push button parts 4c are mounted to the same panel substrate 14, the electric wiring circuit for each of the push button parts 4c disposed in the center part is provided so as to reach the outer periphery of the input module 11, and it is possible to install wiring to the push button parts 4c at the outer periphery of the module 11. In addition, the panel substrates 14 has also perforated parts 14a corresponding to the push button parts 4c on one-to-one.

The lattice panel 15 is a partitioned member for partitioning the display surface 10a into plural areas corresponding to the push button parts 4c respectively. The lattice panel 15 is constructed by combining in the vertical and the horizontal direction in a reticular pattern, frames 15a composed of opaque plastic. The above mentioned panel substrate 14 extends up to the outer periphery of the module 11 along the frame 15a in such a manner that the panel substrate 14 is covered by the frame 15a. Between the frames 15a of the lattice panel 15, sixteen pieces of void parts 15b are provided in the same way as the button perforated parts 12a in the base 12. The push button panel 16 is provided as a part to accept a push-down operation by a player in the input display part 4a. The push button panels 16 is disposed to the void parts 15b of the lattice panel 15 one by one.

Figure 6:
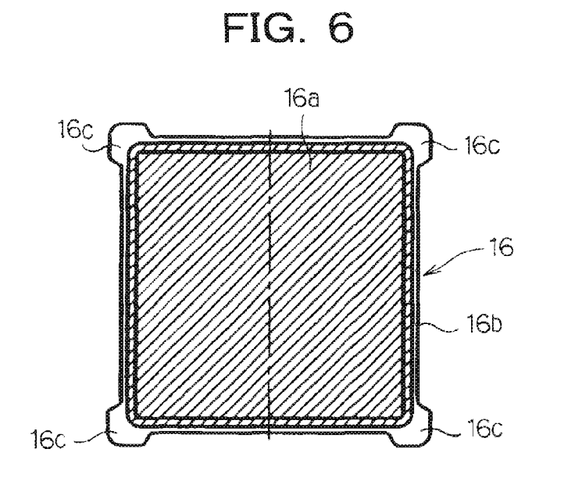
FIG. 6 shows a plane view of the push button panel.
Figure 7:
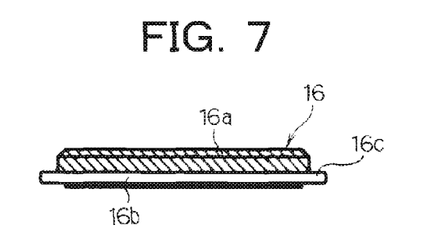
FIG. 7 shows a side view of the push button panel.
Figure 8:
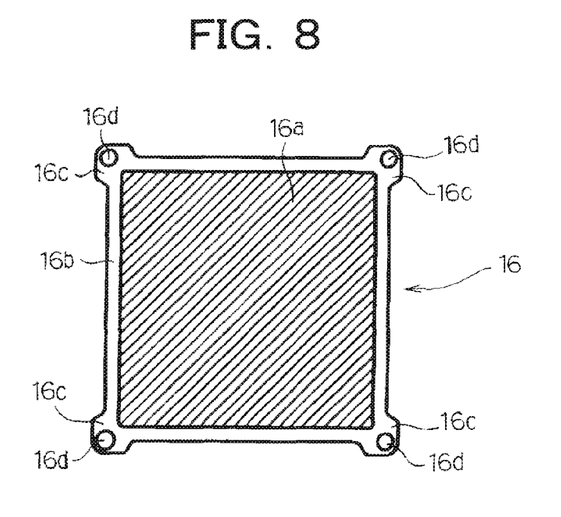
FIG. 8 shows a bottom view of the push button panel.

As shown in FIGS. 6 to 8, the push button panel 16 has a panel main body 16a (the hatched part) in the shape of a substantial square flat plate, and a flange 16b disposed at the lower surface side of the panel main body 16 so as to rim the periphery of the panel main body 16a. At each of four corners of the flange 16b, an extended part 16c is provided as a part of the flange 16b, the extended part 16c protruding outward in the diagonal direction of the push button panel 16. At the back surface (lower surface) side of each extended part 16c, a recessed part 16d in the shape of a circle is formed. The push button panel 16 is composed of transparent plastic, and mirror-like finishing was applied to the front, back and side surfaces of the panel main body 16a. Thereby, the panel main body 16a has a transparency enough high to recognize clearly the screen image in the monitor 10 therebelow. The panel main body 16a corresponds to an operation part of the push button part 4c. Blasting process was applied to the flange 16b (including the extended part 16c). Thereby, the transparency of the flange 16b is lessened to a state of a fogged glass. The transparency of the flange 16b is lessened in order not to see the panel substrate 14, the rubber contact 17, and the base 12 disposed under the push button panel 16 through the panel main body 16a.

Returning to FIGS. 4 and 5, the rubber contact 17 is a part in which the electrodes for detecting the push-down operation of the push-down panel 16 are embedded in the rubber as the elastic body as supporting means which supports the push button panel 16 in an up-and-down movable manner at the four corners. When the rubber contact 17 is compressively deformed by the push-down operation to the push-down panel 16, the inside electrodes conduct electricity, and when the compressive deformation is released, the conduction by the inside electrodes is released. As this kind of rubber contact 17, the one on the market can be employed. The button cover 18 is provided to protect the inside of the input module 11 from ingress of gist and dust, where a void part 18a is formed for exposing the panel main body 16a of the push button panel 16. The button cover 18 is an opaque part, for example, being composed of plastic. The lattice cover 19 is provided as a facing panel for partitioning the push button parts 14c, where void parts 19a are also formed for exposing the panel main bodies 16a of the push button panel 16. The lattice panel 16 is an opaque part, for example, being composed of metal.

Figure 9:
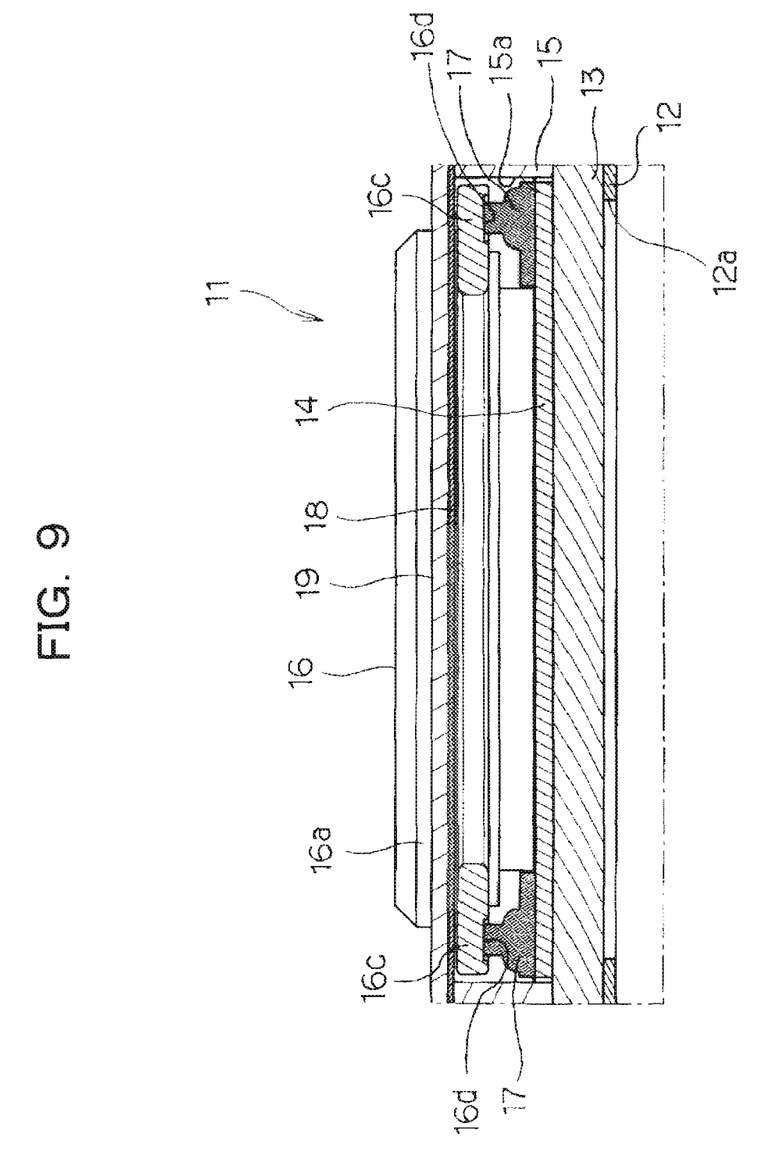
FIG. 9 shows an expanded view of IX portion shown in FIG. 3.

FIG. 9 shows an enlarged view of IX portion shown in FIG. 3. Apparently as shown in FIG. 9, in the input module 11, the lattice base 13 is overlaid on the upper surface of the base 12, and on the upper surface of the lattice base 13, the panel substrate 14 and the lattice panel 15 are overlaid. At each of the void parts 15b in the lattice panel 15, the rubber contact 17 is disposed so as to be overlaid on the panel substrate 14. The push button panel 16 is attached on the rubber contact 17 in such a manner that the recessed part 16d in the extended part 16c is engaged with the top part of the rubber contact 17.

Figure 10:
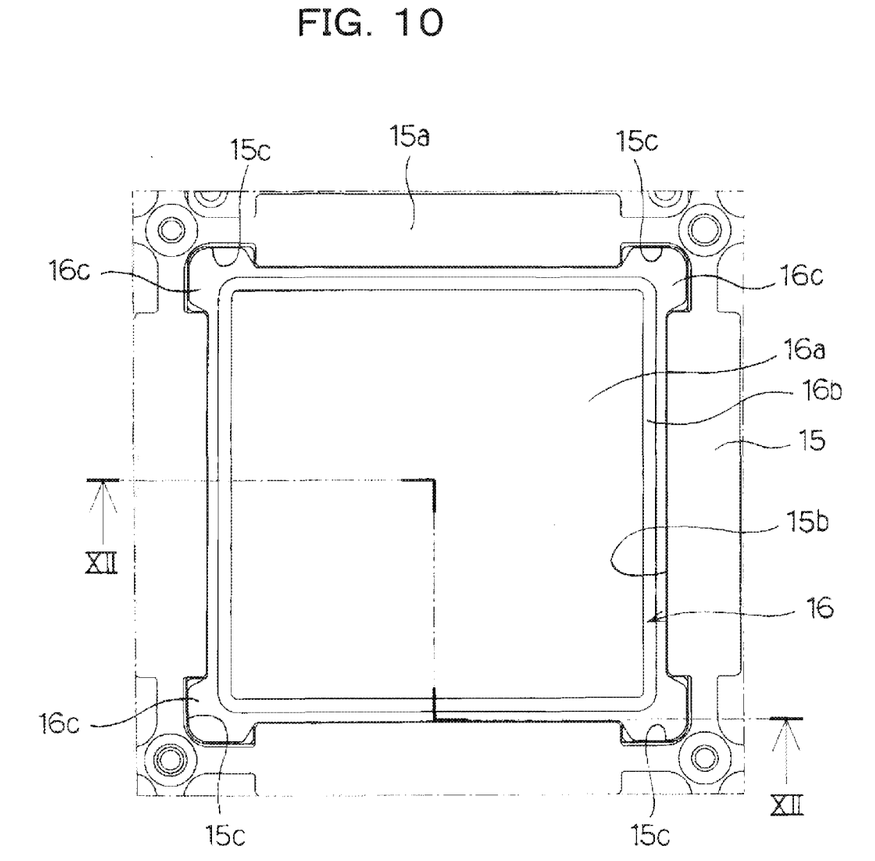
FIG. 10 shows a state that the push button panel is disposed in the void part of the lattice panel.
Figure 11:
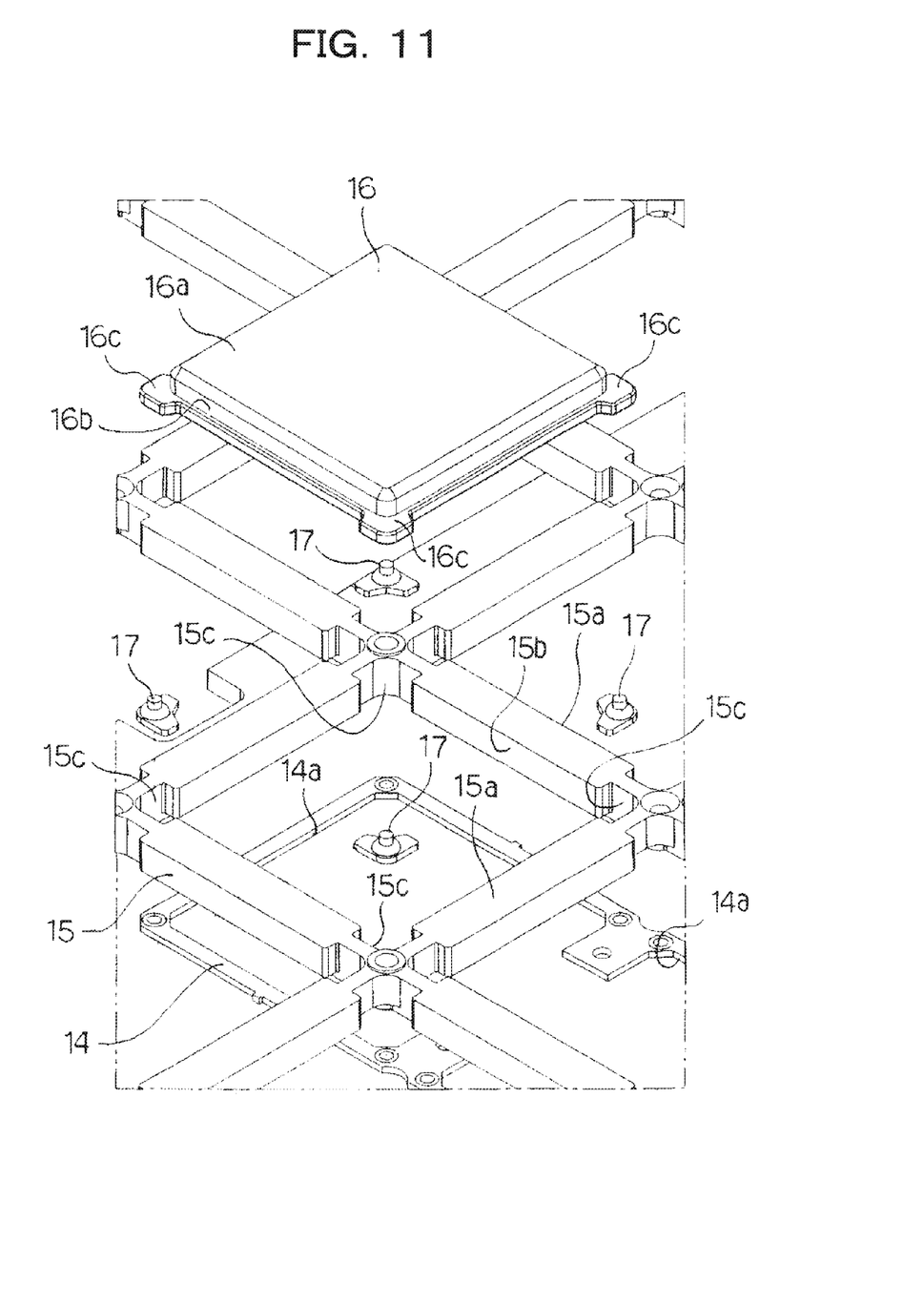
FIG. 11 shows an exploded perspective view with respect to the panel substrate, the lattice panel, the push button panel and the rubber contacts.
Figure 12:
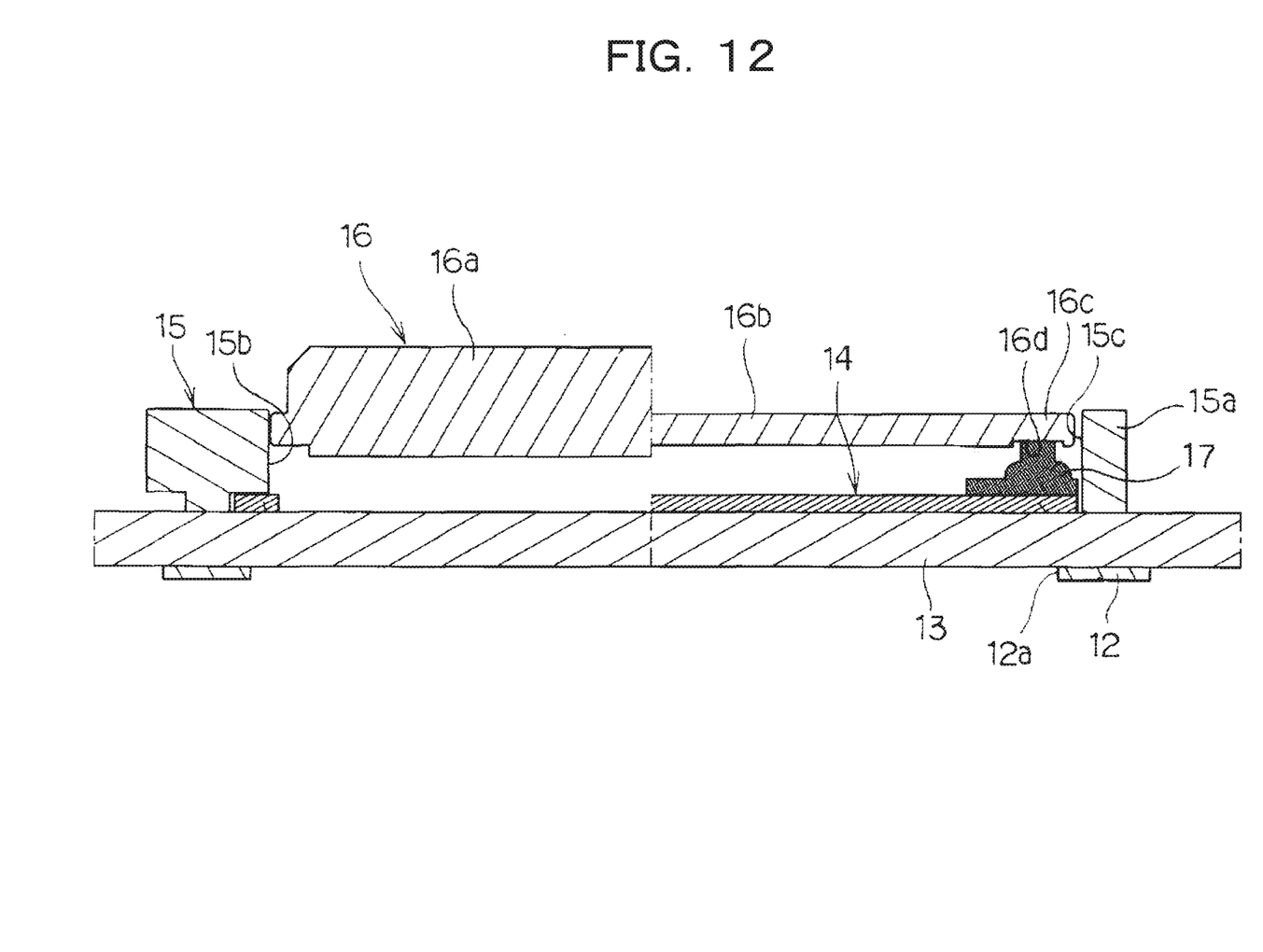
FIG. 12 shows a sectional view along the line XII-XII shown in FIG. 10.

FIG. 10 shows a plane view showing a state that the push button panel 16 is disposed in the void part 15b of the lattice panel 15, FIG. 11 shows an exploded perspective view with respect to the panel substrate 14, the lattice panel 15, the push button panel 16 and the rubber contacts 17. FIG. 12 shows a sectional view along the line XII-XII shown in FIG. 10. Apparently as shown in these drawings, in the lattice panel 15, the recessed parts 15c are provided in such a manner that the void part 15b is enlarged in the direction from each of the four corners of the void part 15b to an intersection point of the frames 15a of the lattice panel 15. At the recessed part 15c, the panel substrate 14 is exposed outside of the frame 15a of the lattice panel 15, and at the exposed part the rubber contact 17 are disposed. The push button panel 16 is disposed in the void part 15b of the lattice panel 15 in such a manner that the extended part 16c at each of the four corners of the push button panel 16 is engaged with the recessed part 15c. In this way, the extended part 16c is provided at each of the four corners of the push button panel 16 as an operation member, and the rubber contact 17 as supporting means and detecting means is provided at the lower surface side of the extended part 16c. Because of that, it is possible to, while keeping supporting stably the push button panel, improve the sensibility of detection with respect to the push-down operation. Namely, as the push button panel 16 is supported at the four corners, it is impossible to improve the supporting stability, and as the supported point and the detected point of the push-down operation are coincident with each other, even if the push button panel 16 is pushed down obliquely to a normal line of the surface of the panel main body 16a, it is possible to detect surely the operation by making the inside electrodes of any one of the rubber contacts 17 conduct. Moreover, as the rubber contact 17 is disposed inside the recessed part 15c and at the lower side of the extended part 16c of each of the four corners, there is no possibility that position gaps could happen. Therefore, it is possible to detect surely the operation. Additionally, the panel substrate 14 is covered by the frame 15a at a region except the recessed parts 15c. Moreover, the base 12 is also covered by the frame 15a.

Returning to FIG. 9, on the upper surface of the lattice panel 15, the button cover 18 and the lattice cover 19 are overlaid in such a manner that the panel main body 16a protrudes from the void parts 18a, 19a of the covers 18, 19. Then, a small screw is screwed in the base 12 through the button cover 18, the lattice panel 15 and the lattice base 13 sequentially from the lattice cover 19. Thereby, the input module 11 is built up integrally. In addition, by screwing a small screw in base 12 through the lattice base 13, the panel substrate 14 is fixed at a constant position. The built up input module 11 is overlaid on the display surface 10a of the monitor 10. The monitor 10 is fixed to the control panel part 3 of the chassis 2, the input module 11 is overlaid on the display surface 10a of the monitor 10 to screw the folding back part 12a of the base 12 to the chasses 2. Thereby, The interface unit 4 is fixed to the chassis 2. Moreover, the frame 20 is also fixed to the monitor 10. The frame 20 extends across entire width of the monitor 10 along the boundary between the input display part 4a and the multi purpose display part 4b so as to partition the parts 4a, 4b. As shown in FIG. 1, a facing panel 5 is provided to the chassis 2 in such a manner that the facing panel 5 rims the periphery of the input display part 4a of the interface unit 4. On the boundary between the input display part 4a and the multi purpose display part 4b, the facing panel 5 is fixed to the chasses 2. By such an fitting structure, while the monitor 10 is shared between all push button parts 4c and the multi purpose display part 4b in the input display part 4a, it is possible to give an impression that they are different display parts from each other.

Figure 13:
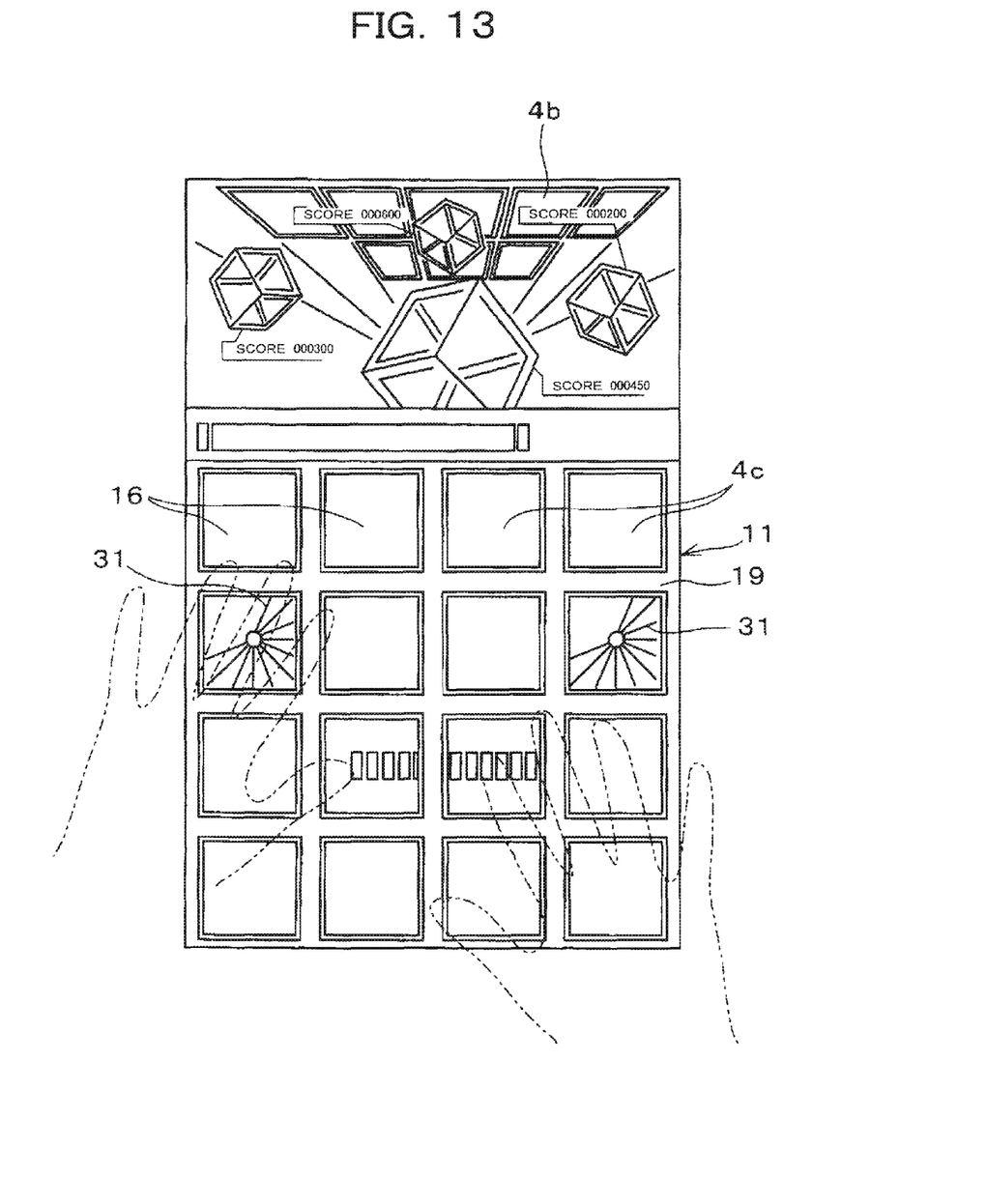
FIG. 13 shows an example of game screen.

In the game machine 1 which is structured as mentioned above, by the control unit 30 provided in the chassis 2, different display control is executed between the input display part 4a and the multi purpose display part 4b. Moreover, a predetermined game is executed by executing display controls which are independent of each other between the push button parts 4c in the input display part 4a. An example of a game screen is shown in FIG. 13. In this example, an operation instruction image 31 is displayed at appropriate push button parts 4c in the input display part 4a, the operation instruction image 31 instructing a timing to perform the push-down operation to the push button part 4c where the image 31 is displayed. The operation timing is predetermined, for example, to the music selected in the game. It is determined by the control unit 30 based on a contact state of the inside electrodes in the rubber contacts 17, whether or not the push button part 4c has been pushed down to the timing instructed by the operation instruction image 31. Based on the determination result, a game score of a player is calculated. In the multi purpose display part 4b, screen image with a different purpose from that of the input display part 4a is properly displayed, the screen image being for example, various kinds of information to inform the player, such as a game score, operation instruction and the like, or screen image for setting the mood for the game.

The present invention is not limited to the above mentioned embodiment, and may be executed as various kinds of embodiments. For example, The number and the arrangement of the push buttons 4c are not limited to the example shown in the drawings, and can be changed to various states. Also, the shape of the panel main body 16a of the push button panel 16 is not limited to the square flat plate, and can be properly changed to a circle-shaped flat plate, a polygonal shape except a quadrangle or the like. Whatever the case, as long as there is provided the structure that the plural extended parts are provided at the outer periphery of the operation member, each of the extended parts is engaged with the recess part of in the void part of the partitioning member put around the periphery of operation member, and the plastic elastic body with electrodes such as a rubber contact is disposed at the lower side of the operation member, it is possible to improve the detective sensibility of the push-down operation while improving the supporting stability of the operation members. Moreover, the structure of the input module 11 as the input device is also not limited to the above mentioned embodiment, and the components such as the base and the lattice base can be properly added, deleted, and changed. In the present invention, on the display surface, only the input display part can be provided.

The invention claimed is:

1. An input device for a game machine, comprising:
a partitioned member which has opaque frames to be disposed on a display surface of a display apparatus, and in which a plurality of void parts for allowing a screen image on the display surface to be visually seen are disposed between the frames;
a plurality of operation members, each of which is disposed over each of the plurality of void parts of the partitioned member and has an operation part with enough transparency to allow the screen image on the display surface to be visually seen;
a plurality of supporting means, each of which supports the operation member in a push-down operable manner; and
a plurality of detecting means, each of which detects a push-down operation of the operation member,
wherein
the operation member is provided with a plurality of extended parts, each of which is extended outward, on an outer periphery thereof,
the partitioned member is provided with a plurality of recessed parts, to each of which each of the plurality of extended parts of the operation member is fitted, such that the recessed part enlarges the void part, and
a plastic elastic body with electrodes, in which electrodes functioning as the detecting means are embedded in an elastic body functioning as the supporting means, is disposed at a lower surface side of each of the plurality of extended parts of the operation member,
wherein
a wiring assembly is disposed along the frames at a lower surface side of the partitioned member,
the wiring assembly is exposed outward from the frame at the recessed part, and
the plastic elastic body with electrodes is disposed at the exposed part.

2. The input device according to claim 1, wherein a lattice panel, in which the frames are arranged vertically and horizontally, is disposed as the partitioned member,
a push button panel, which has a quadrangular flat plate shaped panel main body as the operating part, is disposed as the operation member, and
the extended part is disposed in an extended manner in diagonal directions of the push button panel from four corners thereof.

3. The input device according to claim 2, wherein
a cover extending along the frames is disposed at an upper surface side of the partitioned member, and
the extended parts are covered by the cover.

4. The input device according to claim 2, wherein
the operating part of the operation member is provided with a flange on an outer periphery thereof,
the extended part is disposed such that part of the flange is extended outward, and
the flange, which includes the extended part, is configured so as to lessen a transparency in comparison with the operation part.

5. The input device according to claim 2, wherein a transparent base board is disposed between the partitioned member and the display surface, and
the plastic elastic body with electrodes and the operation members are disposed on the base board.

6. The input device according to claim 1, wherein
a cover extending along the frames is disposed at an upper surface side of the partitioned member, and
the extended parts are covered by the cover.

7. The input device according claim 1, wherein
the operating part of the operation member is provided with a flange on an outer periphery thereof,
the extended part is disposed such that part of the flange is extended outward, and
the flange, which includes the extended part, is configured so as to lessen a transparency in comparison with the operation part.

8. The input device according to claim 1, wherein a transparent base board is disposed between the partitioned member and the display surface, and
the plastic elastic body with electrodes and the operation members are disposed on the base board.

* * * * *